United States Patent
Ranta et al.

(10) Patent No.: US 6,233,229 B1
(45) Date of Patent: *May 15, 2001

(54) METHOD OF ALLOCATING FREQUENCY BANDS TO DIFFERENT CELLS, AND TDMA CELLULAR RADIO SYSTEM

(75) Inventors: Pekka Ranta; Petri Jolma, both of Espoo; Giulio Gandini, Helsinki; Zhichun Honkasalo, Vantaa, all of (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,659
(22) PCT Filed: Nov. 27, 1995
(86) PCT No.: PCT/FI95/00653
   § 371 Date: Sep. 16, 1996
   § 102(e) Date: Sep. 16, 1996
(87) PCT Pub. No.: WO96/17485
   PCT Pub. Date: Jun. 6, 1996

(30) Foreign Application Priority Data

Nov. 28, 1994 (FI) .................................................. 945605

(51) Int. Cl.[7] ........................................................ H04Q 7/00
(52) U.S. Cl. .................... 370/330; 370/337; 370/347; 455/63
(58) Field of Search ................................ 370/328, 329, 370/330, 332, 333, 334, 336, 337, 345, 347, 350; 455/443, 444, 450, 452, 454, 455, 507, 509, 516, 517, 62, 63, 67.3, 132, 133, 134, 135

(56) References Cited

U.S. PATENT DOCUMENTS

| | | |
|---|---|---|
| 4,384,362 | 5/1983 | Leland . |
| 4,914,651 * | 4/1990 | Lusignan ................................ 370/329 |
| 5,067,147 * | 11/1991 | Lee ......................................... 455/436 |
| 5,375,123 * | 12/1994 | Andersson et al. ................... 370/333 |
| 5,499,386 * | 3/1996 | Kalsson .................................. 455/444 |
| 5,546,443 * | 8/1996 | Raith ...................................... 455/450 |
| 5,548,809 * | 8/1996 | Lemson .................................. 455/454 |
| 5,551,064 * | 8/1996 | Nobbe et al. ............................ 455/62 |
| 5,581,548 * | 12/1996 | Ugland et al. ......................... 370/330 |
| 5,640,677 * | 6/1997 | Kalsson .................................. 455/434 |
| 5,655,217 * | 8/1997 | Lemson .................................. 455/513 |

FOREIGN PATENT DOCUMENTS

| | | |
|---|---|---|
| 470 831 | 2/1992 | (EP) . |
| 96/11533 | 4/1996 | (WO) . |

* cited by examiner

Primary Examiner—Chi H. Pham
Assistant Examiner—Kwang B. Yao
(74) Attorney, Agent, or Firm—Pillsbury Madison & Sutro LLP

(57) ABSTRACT

A TDMA cellular radio system and a method of allocating available frequency bands to different cells in a TDMA cellular radio system wherein at least some of the receivers within the system use interference cancellation methods which cancel the effects of co-channel interference in a desired signal. To enable efficient use of interference cancellation and the resulting capacity increase in the system, the frequency bands available for the cellular radio system are allocated to different cells so that groups of adjacent service areas are formed in the system. Each group uses the same frequency band within the service areas, whereby at least one co-channel signal interfering with the desired signal is significantly stronger than other co-channel interfering signals.

10 Claims, 4 Drawing Sheets

```
┌─────────────────────────────────┐
│ TDMA RECEIVERS IN CELLS EMPLOYING│
│ INTERFERENCE CANCELLATION FOR    │
│ CANCELING EFFECTS OF CO-CHANNEL  │
│ INTERFERENCE                     │
└─────────────────┬───────────────┘
                  │
┌─────────────────┴───────────────┐
│ ALLOCATING AVAILABLE FREQUENCY   │
│ BANDS SUCH THAT AT LEAST ONE     │
│ CO-CHANNEL SIGNAL INTERFERING    │
│ WITH THE DESIRED SIGNAL IS STRONGER│
│ THAN OTHER CO-CHANNEL INTERFER-  │
│ ING SIGNALS                      │
└─────────────────┬───────────────┘
                  │
┌─────────────────┴───────────────┐
│ TDMA RECEIVERS IN CELLS CANCELING│
│ EFFECTS OF CO-CHANNEL INTERFERENCE│
│ FROM SAID OTHER CO-CHANNEL       │
│ INTERFERING SIGNALS              │
└─────────────────────────────────┘
```

Fig. 6

METHOD OF ALLOCATING FREQUENCY BANDS TO DIFFERENT CELLS, AND TDMA CELLULAR RADIO SYSTEM

BACKGROUND OF THE INVENTION

The present invention relates to a method of allocating available frequency bands to different cells in a TDMA cellular radio system wherein at least some of the receivers within the system use interference cancellation methods to cancel the effects of co-channel interference in a desired signal.

As far as narrow-band cellular radio systems are concerned, co-channel interference is one of the most significant factors limiting system capacity. The term, co-channel interference, refers to interference in the desired signal caused by signals transmitted in nearby cells on the same frequency. For this reason, cellular radio systems have conventionally been designed so that the same frequency is only used in cells located at a sufficient distance from each other, whereby the interfering signals remain within acceptable limits as a result of propagation attenuation of the signals. This leads to a re-use pattern in the cellular structure. For example, re-use pattern seven is one in which one seventh of all available frequency bands is allocated to every cell, and the same frequencies are re-used at a relative re-use distance of $\sqrt{21}$ from each other.

The system capacity is to be increased, the need arises to shorten the re-use distance without, decreasing transmission quality. Conventionally, an increase in system capacity has been achieved by decreasing cell sizes and reducing transmission power levels. Another method for solving the problems concerning capacity is to keep up with the fast development of digital signal processing, and utilize the interference cancellation algorithms developed. Cancelling cancellation of co-channel interference in the receiver enables a more efficient frequency re-use within the network.

In the present-day cellular radio systems, co-channel signals are approximated in the receiver as a random additive white Gaussian noise. This approximation is sufficient as long as interfering co-channel signals are not too strong. It is an aim of conventional cell planning to ensure this by a sufficient re-use distance.

In interference limited cellular radio systems, however, co-channel interference is typically of a deterministic nature, suggesting that it should be possible to cancel, at least partly, its effects on the desired signal.

Previously, interference cancellation methods have been developed for use in code division multiple access (CDMA) systems, which are interference limited type. It is, however, much more difficult to apply interference cancellation techniques to TDMA systems. The Finnish patent publication 944736, discloses a method for utilizing interference cancellation methods in TDMA systems.

Thus, interference cancellation methods are based on detecting some interfering signals and canceling their effect in the desired signal. The interference cancellation algorithms function better, the more accurately the interfering signals can be detected. Hence, the most advantageous situation for implementation of interference cancellation algorithms is where the receiver is receiving, along with the desired signal, a number of interfering signals which are clearly stronger than the other sources of interference, and can be canceled by the algorithms.

In frequency and cell planning of conventional cellular radio systems, however, the aim is that all the interfering signals will be as weak as possible from the point of view of the desired signal. As a result, interference cancellation methods do not function in an optimum manner in systems designed by conventional methods.

SUMMARY OF THE INVENTION

It is an object of the present invention to provide a cellular radio system in which the use of interference cancellation methods is taken into account at the planning stage of the system, and in which an efficient application of such methods, as a result of network planning carried out according to the invention, enables a higher capacity than what has been possible heretofore.

This object is achieved by a method set forth in the foregoing background section. The available frequency bands of the cellular radio systems are allocated to different cells that in each cell so at least one co-channel signal interfering with the desired signal is significantly stronger than other co-channel interfering signals.

The invention further relates to a TDMA cellular radio system which includes in each cell, at least one base station communicating with the subscriber terminal equipments within its service area, is allocated a group of frequency bands, and at least some of the receivers of the system use interference cancellation methods to cancel the effects of co-channel interference in the desired signal. In the TDMA cellular radio system in accordance with the invention, the available frequency bands in each cell of the cellular radio system have been selected so that at least one co-channel signal interfering with the desired signal is significantly stronger than the other co-channel interfering signals.

According to the basic idea of the method of the invention, the available frequency bands of the cellular radio system are allocated to different cells so that several groups of adjacent service areas are formed in the system, each group uses the same frequency band within the service areas. Thus, for each group, a situation is intentionally created in which one co-channel signal interfering with the desired signal is significantly stronger than co-channel interfering signals originating in other signal sources. This enables an efficient application of interference cancellation algorithms, which leads to the terminal equipment and the base stations being capable of operating at a lower signal to noise ratio, but at the same transmission quality as before.

As a result of use the method according to the invention, a better sensitivity of the receiver is achieved. It is possible to utilize the improved sensitivity in a multitude of ways. The increase in the capacity of the cellular network was already mentioned above. In addition, it is possible to improve the quality of the connections as a result of the receivers tolerating a higher level of interference. Furthermore, cell sizes and data transmission rates may be increased.

BRIEF DESCRIPTION OF THE DRAWINGS

In the following, the invention will be described in greater detail by means of a preferred embodiments with reference to the examples of the attached drawings, in which:

FIG. 6 is a schematic representation of a method in accordance with the present invention.

DETAILED DESCRIPTION

The method of the present invention for allocating frequencies to different cells may be applied to any digital TDMA cellular radio system. The method of the present invention also does not set any limits on the interference cancellation algorithm used. The performance of all prior art interference cancellation methods suitable for a cellular radio environment will be enhanced, as long as the network planning is carried out according to the present invention.

Figure 1:
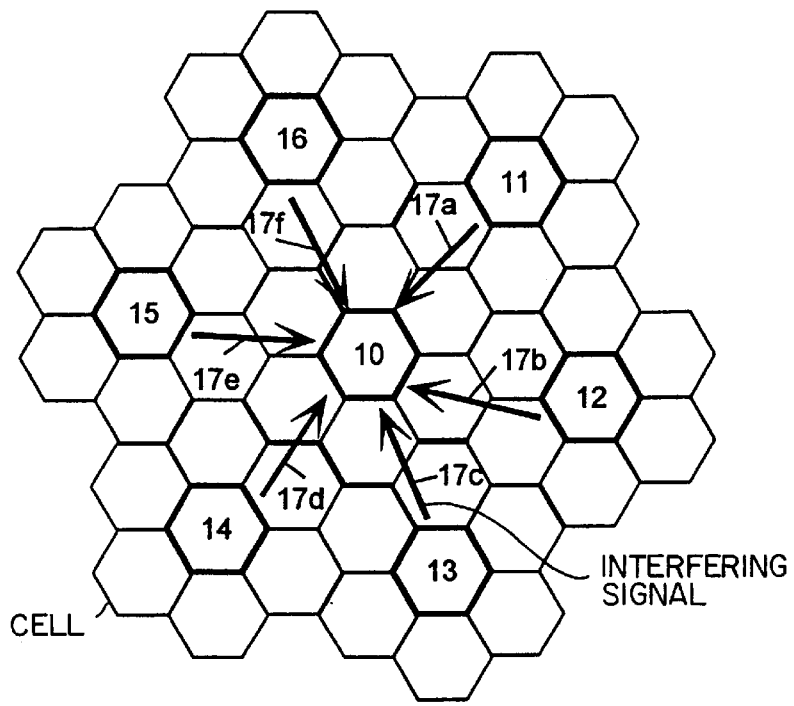
FIG. 1 shows a conventional frequency allocation of a cellular radio system.

FIG. 1 illustrates the conventional way of allocating frequencies to different cells, with a re-use factor of seven. This means that one seventh of all the frequency bands of the system is in use in each cell, and the same frequency bands are re-used as illustrated by FIG. 1, in which the frequencies used in cell 10 are also used in cells 11–16. It is assumed that the desired connection is located in cell 10, and that the same channel (the same time slot on the same frequency) is also used in cells 11–16. In such as case, as illustrated by FIG. 1, the interfering signals 17a–17f arrive in the cell 10 from approximately an equal distance. Naturally, each signal undergoes an individual multipath propagation and fading, which means that the signal levels vary to some extent, but the attenuation caused by distance is equal.

In the solution according to the invention, the goal, at the stage of determining the structure and operation of the network, is to take into account that at least some of the receivers of the network could utilize interference cancellation. In practice, this may be taken into account by seeking a network solution where one or several interfering co-channel signals are in all probability significantly stronger than the overall interference level. As far as frequency planning is concerned, this leads to irregular re-use patterns.

Figure 2:
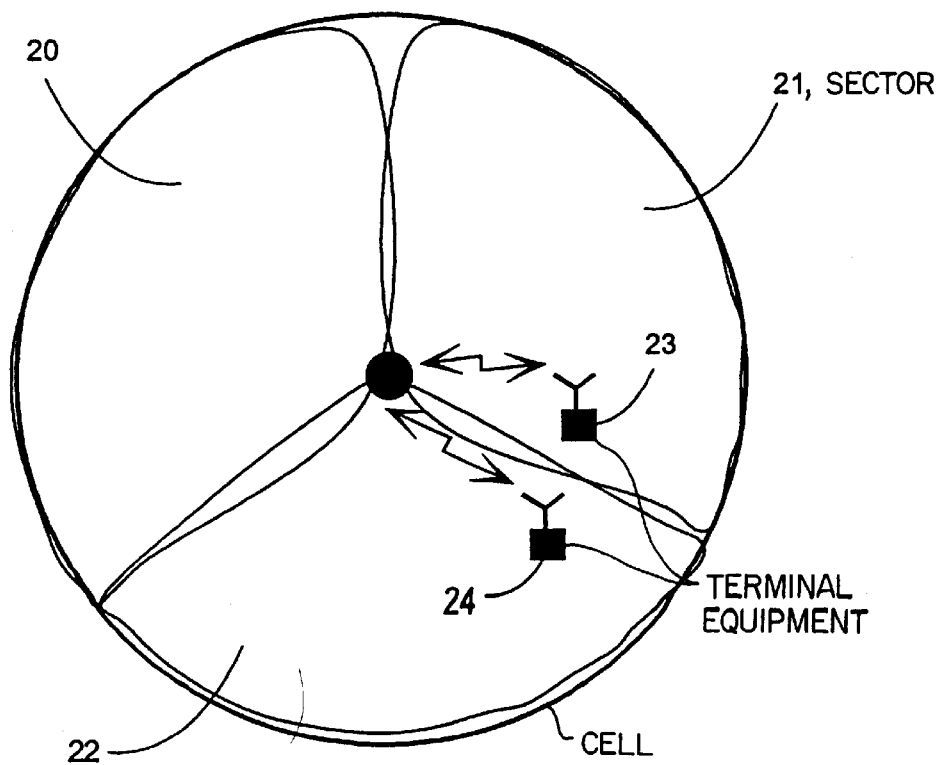
FIG. 2 shows a cell divided into three sectors.
Figure 3:
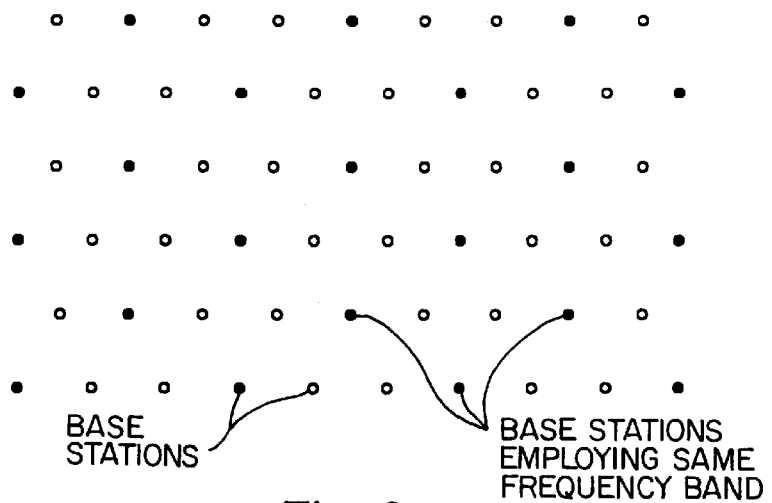
FIG. 3 shows a frequency allocation with a re-use factor of three.

FIG. 2 illustrates a cell which has been divided into three sectors 20–22 by directional antennas. Conventionally, each sector used a dedicated frequency different from the one used in a other sectors, and the same group of three frequency bands has been used with the re-use factor of three. The re-use is illustrated in FIG. 3. FIG. 3 shows a group of cells base stations located at the center of cell, the base stations are indicated by small circles. FIG. 3 indicate those base stations that the filled-in circle in use the same specific frequency band.

According to the method of the invention, all three sectors 20–22 use the same frequency, and the other two frequencies are left for use by other cells. In this situation, it is essential that all the receivers be able to utilize interference cancellation. As far as interference is concerned, the worst situation emerges at the border of two adjacent sectors. An example of such a situation is illustrated in FIG. 3, where the terminal equipment 23 communicates with the receiver of sector 21, the terminal equipment 24 communicates with the receiver of sector 22, and both pieces of equipment 23,24 are close to each other at the border of the sectors. Terminal equipment 23 and 24 are associated with users that may transfer user data between themselves. If both pieces of terminal equipment, which communicate with different sectors as mentioned above, use the same frequency and time slot for communicating with the base station, the terminal equipment heavily interfere with each other, and the signal to noise ratio is 0 dB at its worst. It is not possible for the ratio to decrease from that because at that stage, handover to another sector is carried out. From the point of view of the interference cancellation algorithms, it is clear that this solution provides a desired situation where one or two co-channel signals are significantly stronger than interference from any other source. The potential benefit in the capacity increase can be estimated to exceed 30%.

The method of the invention is by no means restricted to dividing the cell into three sectors as in the example above. It is possible to divide each cell into two or more sectors; in principle, the number of sectors is unlimited.

Figure 4:
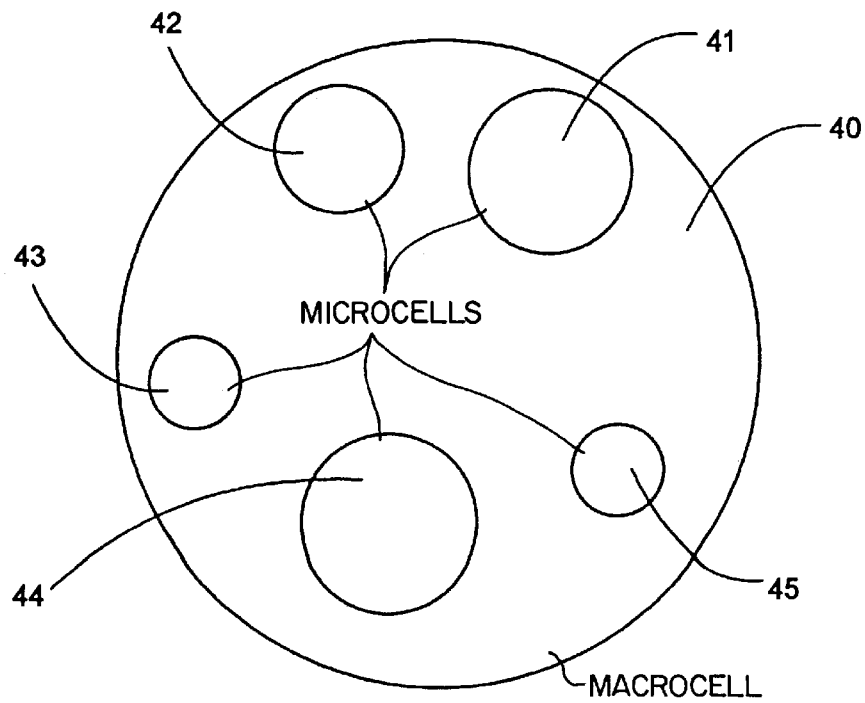
FIG. 4 illustrates an example of overlapping microcells and macrocells.

FIG. 4 illustrates a network structure in which the network is implemented by a group of small microcells 41–45 and a large macrocell 40 that covers the same geographical area. The macrocell corresponds to a present-day conventional cell, which handles mobile communication. The microcells may be cells inside buildings, for example, or cells providing extra capacity to traffic nodes. In the latter case, the macrocell is an umbrella cell, by which an easy handover from one microcell to another can be achieved.

In the frequency planning solution according to the invention, both the macrocell 40 and the microcells 41–45 use the same frequency band. There is no need for the macrocell and the microcells to be synchronized with each other. Compared to the macrocells, transmission power levels used by the microcells are low, so that co-channel interference caused by the microcells to the macrocell is negligible, consequently, no interference cancellation is required in the macrocell. The co-channel interference in the communication links from a macrocell to a microcell may be eliminated by interference cancellation. Interference cancellation should be used all of the microcell receivers. Co-channel interference between the microcells is negligible due to the low transmission power levels used in the cells.

The arrangement described above enables an advantageous implementation of office microcells, for example, in an area where there already exists a macrocell in the same frequency range. Office microcells located in other buildings do not interfere with each other due to a severe propagation attenuation and the low transmitting power mentioned above.

Figure 5A:
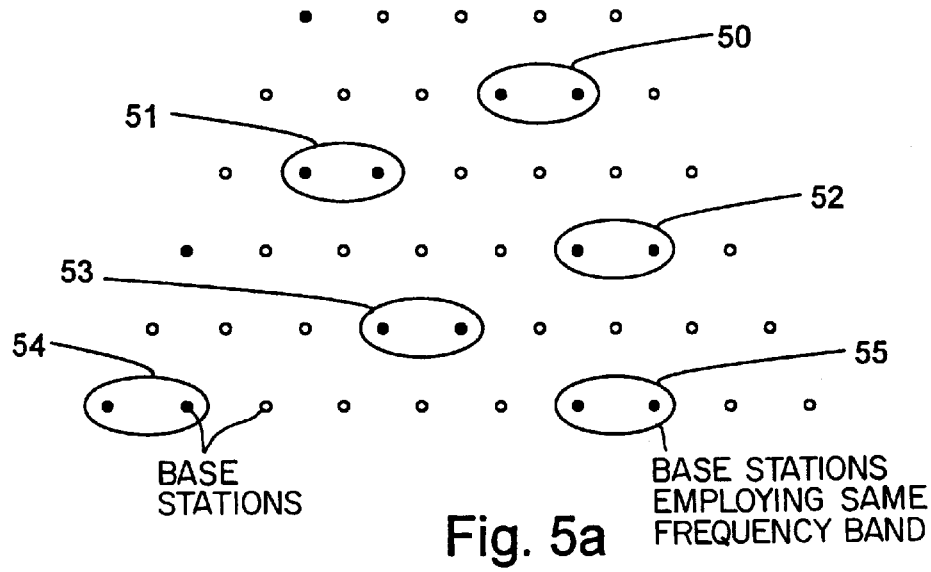
FIGS. 5a–5b illustrate the frequency allocation of a cellular radio system implemented by cell pairs, with re-use factors of three and five.
Figure 5B:
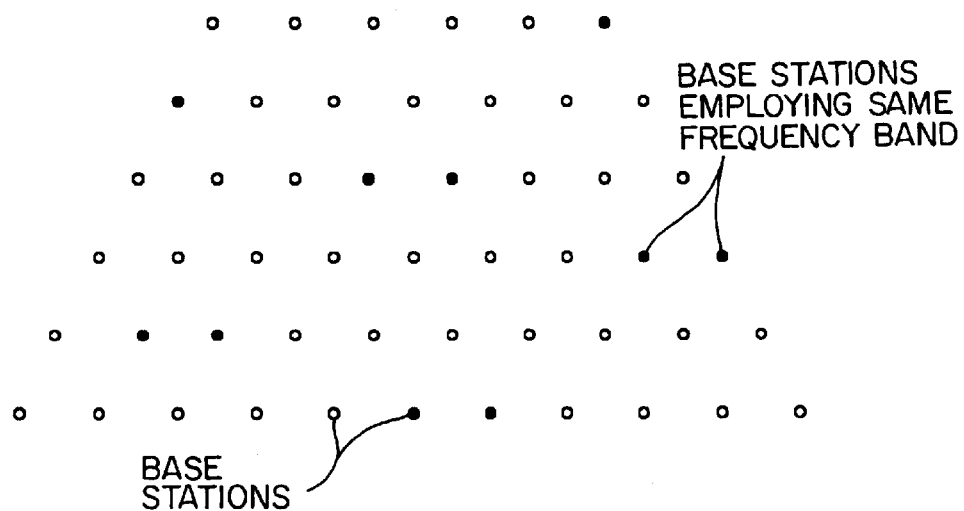

FIG. 5a illustrates a third preferred embodiment of the invention, in which the frequency bands available are allocated so that the cellular network includes cell groups 50–55 within which the same frequency band is used in the cells. The cell groups may comprise two or more cells, and the number of cells per cell group may vary on a group-to-group basis. In the example of FIG. 5a, each cell group comprises two cells, i.e., a cell pair. As in FIG. 3 above, FIG. 5a illustrates a group of cells indicated by base stations their at the center of each cell so that small circles represent the base stations. The fill-in circles in FIG. 5a represent those base stations using the same, specific frequency band. In the example according to FIG. 5a, in both cells of the cell pair, a co-channel signal originating in the other cell of the cell pair and interfering with the desired signal is significantly stronger than the co-channel interfering signals originating in the other cells. It is assumed that the cells of the cell pairs are synchronized with regard to each other. In FIG. 5a, the frequencies of the cell pairs are re-used with a re-use factor of three. Correspondingly, in FIG. 5b, the frequencies of the cell pairs are re-used with a re-use factor of five. At its best, the capacity increase achieved by the solution is 150%.

In the cell group solution, the capacity may be increased even further by using directional antennas in the cells, enabling a further decrease in the interference originating in the other cell groups that use the same frequency range.

The idea according to the invention may also be implemented by decreasing, in comparison with conventional frequency planning, the re-use factor of the frequency bands of the cellular radio network, which re-use factor determines the distance at which the frequency band may again be used. In such a case, co-channel interference is commonly increased compared with the normal situation. By an appropriate positioning of the base stations, a situation is created where in all probability a few co-channel signals interfering with the desired signal are in each cell significantly stronger than the other co-channel interfering signals. This is based on each signal having an individual propagation and attenuation on the radio path.

The idea of the invention may also be carried out by using the same time slot of the same frequency band within the service area of one base station of the cellular radio system on two separate connections between the base station and the terminal equipment. This means that the strongest co-channel interference (which can be canceled by interference cancellation algorithms) originates in the area of the same cell.

Although the invention is described above with reference to the examples in the accompanying drawings, it is obvious that the invention is not restricted thereto, but it may be modified in a number of ways within the scope of the inventive idea disclosed in the attached claims.

What is claimed is:

1. A method of allocating available frequency bands to respective ones of the cells in a TDMA cellular radio system by using frequency planning, said method comprising:

at least some receivers within the cellular radio system employing interference cancellation which cancel effects of co-channel interference in a desired signal;

allocating available frequency bands of the cellular radio system to respective ones of the cells so that, in each cell, at least one co-channel signal interfering with the desired signal is significantly stronger than other co-channel interfering signals, the at least one co-channel signal and the desired signal simultaneously carrying user data traffic of at least two different users; and respective ones of said receivers canceling effects of co-channel interference from respective ones of said other co-channel interfering signals.

2. The method as claimed in claim 1, wherein:

said allocating includes allocating said available frequency bands of said cellular radio system, to respective ones of said cells such that several groups of adjacent service areas are formed in said cellular radio system each group of which employs a respective one of said frequency bands within each of said service areas.

3. The method as claimed in claim 1, wherein:

said allocating includes available frequency bands dividing each cell into two or more sectors by using directional antennas, and using that a respective one of said frequency bands is used in each sector of respective ones of said cells, whereby, in each sector of each cell at least one co-channel signal originating in an adjacent sector of the respective cell and interfering with the desired signal is significantly stronger than the co-channel interfering signals from the others of said cells.

4. The method as claimed in claim 1, wherein:

said allocating includes allocating said frequency bands according to a re-use factor chosen to so low that in each cell, one or more co-channel signals interfering with the desired signal are significantly stronger than the other co-channel interfering signals.

5. The method as claimed in claim 1, wherein:

said allocating includes causing a same time slot of a given one of said frequency bands to be used on two separate connections within a service area of one base station.

6. A method of allocating available frequency bands to respective ones of the cells in a TDMA cellular radio system by using frequency planning, said method comprising:

at least some receivers within the cellular radio system employing interference cancellation which cancel effects of co-channel interference in a desired signal;

allocating available frequency bands of the cellular radio system to respective ones of the cells so that, in each cell, at least one co-channel signal interfering with the desired signal is significantly stronger than other co-channel interfering signals; and respective ones of said receivers canceling effects of co-channel interference from respective ones of said other co-channel interfering signals, wherein said allocating includes allocating said available frequency bands such that said cellular radio system comprises a plurality of large macrocells, each having a respective service area and each employing a specific one of said available frequency bands, and such that within the respective said service area of each said macrocell, there are a group of microcells each of which is significantly smaller than the microcell, and using in each of said microcells a respective same frequency band as is being used in the corresponding said macrocell, whereby in each microcell one stronger that the co-channel interfering signals originating in the others of said cells.

7. The method as claimed in claim 6, wherein:

said employing includes receivers of said microcells employing interference cancellation.

8. A method of allocating available frequency bands to respective ones of the cells in a TDMA cellular radio system by using frequency planning, said method comprising:

at least some receivers within the cellular radio system employing interference cancellation which cancel effects of co-channel interference in a desired signal;

allocating available frequency bands of the cellular radio system to respective ones of the cells so that, in each cell, at least one co-channel signal interfering with the desired signal is significantly stronger than other co-channel interfering signals; and respective ones of said receivers canceling effects of co-channel interference from respective ones of said other co-channel interfering signals, wherein said allocating includes allocating said available frequency bands such that said cellular radio system consists of adjacent cell groups, which groups each comprise two or more cells, which cells employ, within each cell group a respective same frequency band, whereby, for each cell group, in each cell at least on co-channel signal interfering with the desired signal is significantly stronger than the co-channel interfering signals originating in the others of said cells.

9. The method as claimed in claim 8, wherein:

said allocating includes causing the number of cells in each said cell group to differ cell group-specifically.

10. A TDMA cellular radio system, said system comprising:
- in each cell of a plurality of cells, at least one base station communicating with subscriber terminal equipment within a respective service area, said system having a group of frequency bands allocated thereto, said frequency bands being allocated by frequency planning;
- a plurality of receivers, at least some of which employ interference cancellation which cancel effects of co-channel interference in a respective desired signal, the at least one co-channel signal and the desired signal simultaneously carrying user data traffic of at least two different users; and
- said frequency bands being so allocated that, in each cell of the cellular radio system, at least one co-channel signal interfering with the desired signal is significantly stronger than the other co-channel interfering signals.

* * * * *